July 9, 1946.    B. J. ROSS    2,403,614
CALCULATING INSTRUMENT
Filed Dec. 4, 1943
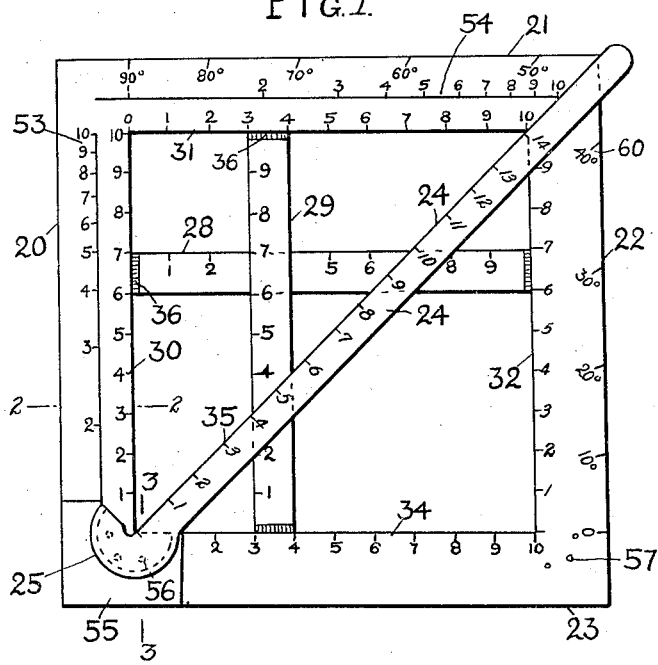
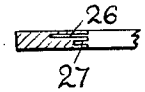
BORIS J. ROSS
INVENTOR
BY John P. Nikonow
ATTORNEY Patented July 9, 1946

2,403,614

UNITED STATES PATENT OFFICE 2,403,614

CALCULATING INSTRUMENT

Boris J. Ross, New York, N. Y.

Application December 4, 1943, Serial No. 512,892

1 Claim. (Cl. 33—80)

My invention relates to calculating instruments and has particular reference to instruments employing angular scales with movable arms adapted for solving various mathematical problems.

My invention has for its object to provide an instrument by means of which it is possible to solve various problems for rapidly solving various problems involving multiplication, divisions, etc., as, in connection with determination of the trim and stability of vessels.

I provide my instrument with four legs, forming a square frame, with an arm pivoted at one inner corner of the frame, and with cross slides or scales at right angles to each other in the frame. By providing the sides of the frame, the arm, and the slides, with suitable scales, the device can be used for solving various mathematical and other problems.

My instruments can be also used as protractors, as proportional compasses, etc.

For more accurate compilation, a board may be provided for my instrument with a sliding frame of a larger size than the frame of my instrument, the latter being slidably placed in the sliding frame. Corresponding scales are provided for the board and the sliding frame, with verniers for accurate placement of the starting points.

My invention is more fully described in the accompanying specification and drawing in which:

Fig. 1 is a plan view of a modified instrument, used for various mathematical calculations;

Fig. 2 is a sectional detail view taken on the line 2—2 of Fig. 1;

Fig. 3 is a sectional detail view taken on the line 3—3 of Fig. 1;

My calculating instrument as shown in Figs. 1, 2, and 3: It consists of a rectangular (preferably square) frame formed of bars or legs 20, 21, 22 and 23, with a movable leg or rule 24 having a pivot 25. The inner edges of the rules are provided with longitudinal slots 26, 27 (Fig. 3) for sliding rules 28, 29. The rules have scales 30, 31, 32, 34, and 35, all with the same divisions. Verniers 36 may be provided at the ends of the movable rules for more accurate readings. Logarithmic scales 53, 54 may be also provided for performing various calculations.

The pivot 25 may be placed on a detachable pad or plate 55 with fastening or dowel pins 56, tightly although removably engaging corresponding holes in the frame, the pad or plate may be removed and the pins fitted in similar holes 57 in the right corner of the frame, for making calculations with negative values.

Operation of this device is as follows, assuming that every unit of the lower scale of the square and of the parallel sliding rule represents 10 units of all the other scales, also that the pivot of the movable rule is at the point of origin of the square and that the sliding rules are in their original positions.

The addition can be performed by the alternate shifting of the parallel inside rule and of the square upward, reading the result on the vertical rule.

The subtraction can be performed by the inverse operation.

The multiplication can be performed by adjusting the parallel inside rule 28 in such a way that reading on the vertical rule 29 of the square corresponds to the value of the first variable (factor), and by shifting the movable rule 24 in such a way that the reading on the upper scale 31, where it is intersected by the rule 24, will correspond to the value of the second variable (factor). The result (product), reduced ten times, can be read on the inside parallel rule 28. With the same reading on the inside parallel rule, moved in the way that the reading on the vertical rule of the square corresponds to one division of the board, and the movable rule passing through the point of intersection of the inside rules, the result (or product), can be read on the upper parallel rule of the square from 0" to the point of intersection of the scale and of the movable rule 24.

The division can be performed by adjusting the inside parallel rule 28 in such a way that the reading on the vertical scale 30 on the square will correspond to the divisor, and the scale on the parallel inside rule 28, adjusted by means of the vertical inside rule, will correspond to the dividend.

With the movable rule 24 passing through the point of intersection, the result can be read on the upper scale 31 of the square.

The square root of a number can be obtained by adjusting the vertical inside rule 29 in such a way that reading on the upper scale 31 of the square will correspond to the value of the number, and by adjusting the movable rule 24 and the parallel inside rule 28 in such a way that the readings on the vertical and on the parallel scales will be the same. This reading will represent the square root of the number.

The result of the foregoing arithmetic operation can be fixed on the paper by shifting the slide rule along the parallel and vertical scales of the board for the purpose of using it as a new point for a further operation.

The shifting of the slide rules together with the square, changes the magnitude of the factors, as, for instance, by shifting the vertical sliding rule to the right, ten units will be added to the reading on the upper horizontal scale of the square, changing the product accordingly.

With the pivot of the movable rule at the point of origin on the paper, by shifting of the sliding rules together with the square, readings of the scale will be changed automatically (multiplication or division) in proportion to the parallel or vertical reading of the scales.

Due to the fact that the arithmetic operations, performed by the instrument, involve only the functional length, represented by conventional scales, any functions of the higher mathematics, properly adjusted to the respective scales, can be evaluated without the use of any special tables, and with greater rapidity.

My device can also be used for various other problems in mathematics, in application to technical and scientific fields. It can be also used as a drafting device, with the movable rule arranged to swing for 90°, without the board, as, for instance:

1. As a triangle, to draw any desired angles (the degrees of a circle can be marked on the outer edges of the rules).
2. As a proportional divider.
3. As a scale transformer.
4. As a table of any function, when the function is a ratio of a radius. The reading will show the value of the function for any numerical value of the radius.
5. As a device for plotting stability and trim of a ship with the use of a special hydrostatic chart of the ship, also for traverse and other plotting.
6. As a substitute for an ordinary slide rule, with wider field of application.

Geometric or other scales 53, 54 may be added to the instrument for various calculations, as well as degrees 60 of a circle.

It is understood that my calculating instruments may be further modified without departing from the spirit of the invention, as set forth in the appended claim.

I claim as my invention:

A calculating instrument comprising four legs joined at the ends and forming a square frame; an arm having a round pivot at one end; a round cage on the frame for rotatively supporting the pivot, the axis of rotation of the pivot passing through the point of intersection of the inner edges of two adjacent legs and of one edge of the arm, the pivot and the cage having a cut-out portion extending to the center of rotation of the pivot to maintain the said point of intersection of the three edges exposed for all positions of the arm; scales having identical divisions on the two adjacent legs and on the arm, all the scales beginning at the axis of rotation of the arm, the other two arms having similar scales at the inner edges, the arm extending over one or the other of the said other two legs, depending on its position, the common zero point of each of the three converging scales being therefore readable and exposed to plotting on an underlined paper.

BORIS J. ROSS.